(12) United States Patent
Wang

(10) Patent No.: US 7,944,078 B1
(45) Date of Patent: May 17, 2011

(54) WIND TURBINE WITH HYDRO-TRANSMISSION

(76) Inventor: Chi-Hsiang Wang, Yingge Township (TW)

( * ) Notice: Subject to any disclaimer, the term of this patent is extended or adjusted under 35 U.S.C. 154(b) by 0 days.

(21) Appl. No.: 12/704,670

(22) Filed: Feb. 12, 2010

(51) Int. Cl.
*F03B 13/00* (2006.01)
(52) U.S. Cl. .............................. 290/55; 290/44; 290/54
(58) Field of Classification Search ............. 290/43, 290/44, 54, 55; 60/398, 698; 416/1, 7, 4, 416/4.2, 4.3, 4.5, 123 B, DIG. 4
See application file for complete search history.

(56) References Cited

U.S. PATENT DOCUMENTS

| 6,457,307 | B1 * | 10/2002 | Feldman et al. | 60/398 |
| 6,574,957 | B2 * | 6/2003 | Brumfield | 60/398 |
| 6,923,622 | B1 * | 8/2005 | Dehlsen | 416/87 |
| 6,972,498 | B2 * | 12/2005 | Jamieson et al. | 290/55 |
| 7,329,962 | B2 * | 2/2008 | Alstot et al. | 290/54 |
| 2009/0273186 | A1 * | 11/2009 | Plant, Jr. | 290/44 |

* cited by examiner

*Primary Examiner* — J Gon
*Assistant Examiner* — Iraj A Mohandesi
(74) *Attorney, Agent, or Firm* — The Weintraub Group, PLC

(57) ABSTRACT

A wind turbine with hydro-transmission has a tank filled with circulating liquid, a generator disposed beside the tank, a water pump mounted at a top of a stand and multiple blades connected to the water pump. Wind rotates the blades to drive the water pump to draw the circulating liquid up and pouring the circulating liquid over the generator to generate electricity. The generator that needs more maintenance is disposed on the ground and the water pump that needs less maintenance is mounted at the top of the stand. Therefore, construction and maintenance costs as well as footprint of the wind turbine are reduced.

2 Claims, 2 Drawing Sheets

WIND TURBINE WITH HYDRO-TRANSMISSION

BACKGROUND OF THE INVENTION

1. Field of the Invention

The present invention relates to a wind turbine, especially to a wind turbine with hydro-transmission.

2. Description of the Prior Art(s)

In recent years, wind turbines have been used to convert kinetic energy from wind into electricity.

With reference to FIG. 2, a conventional wind turbine (60) has a tower (61) and multiple blades (62) mounted at a top of the tower (61). The wind rotates the blades (62) to drive a generator (64) through a gearbox (63) to generate electricity. However, since the gearbox (63) and the generator (64) are heavy and the blades (62) have to be mounted in high place, the tower (61) has to be strong enough to support the blades (62), generator (64) and gearbox (63). Moreover, to assemble the wind turbine (60), the gearbox (63) and the generator (64) have to be mounted at the top of the tower (61), then the tower must also be climbed to maintain the generator (64) and gear box (63). Therefore, construction and maintenance costs of the wind turbine (60) are high.

To overcome the shortcomings, the present invention provides a wind turbine with hydro-transmission to mitigate or obviate the aforementioned problems.

SUMMARY OF THE INVENTION

The main objective of the present invention is to provide a wind turbine with hydro-transmission. The wind turbine has a tank filled with circulating liquid, a generator disposed beside the tank, a water pump mounted at a top of a stand and multiple blades connected to the water pump.

Wind rotates the blades to drive the water pump to draw the circulating liquid up and pouring the circulating liquid over the generator to generate electricity. The generator that needs more maintenance is disposed on the ground and the water pump that needs less maintenance is mounted at the top of the stand. Therefore, the stand does not need to be climbed as frequently so the wind turbine is safer. Moreover, the wind turbine can be built more simply and less sturdy so construction and maintenance costs as well as footprint of the wind turbine are reduced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
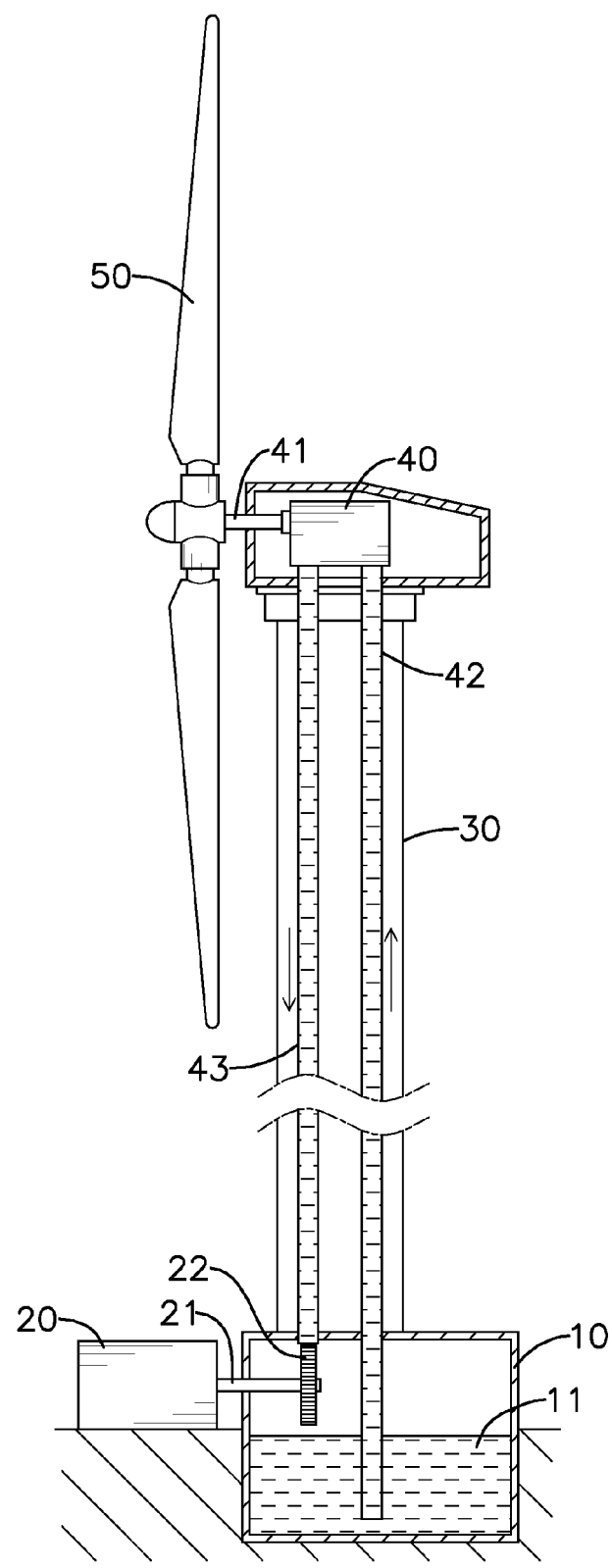
FIG. 1 is a side view in partial section of a wind turbine with hydro-transmission in accordance with the present invention.
Figure 2:
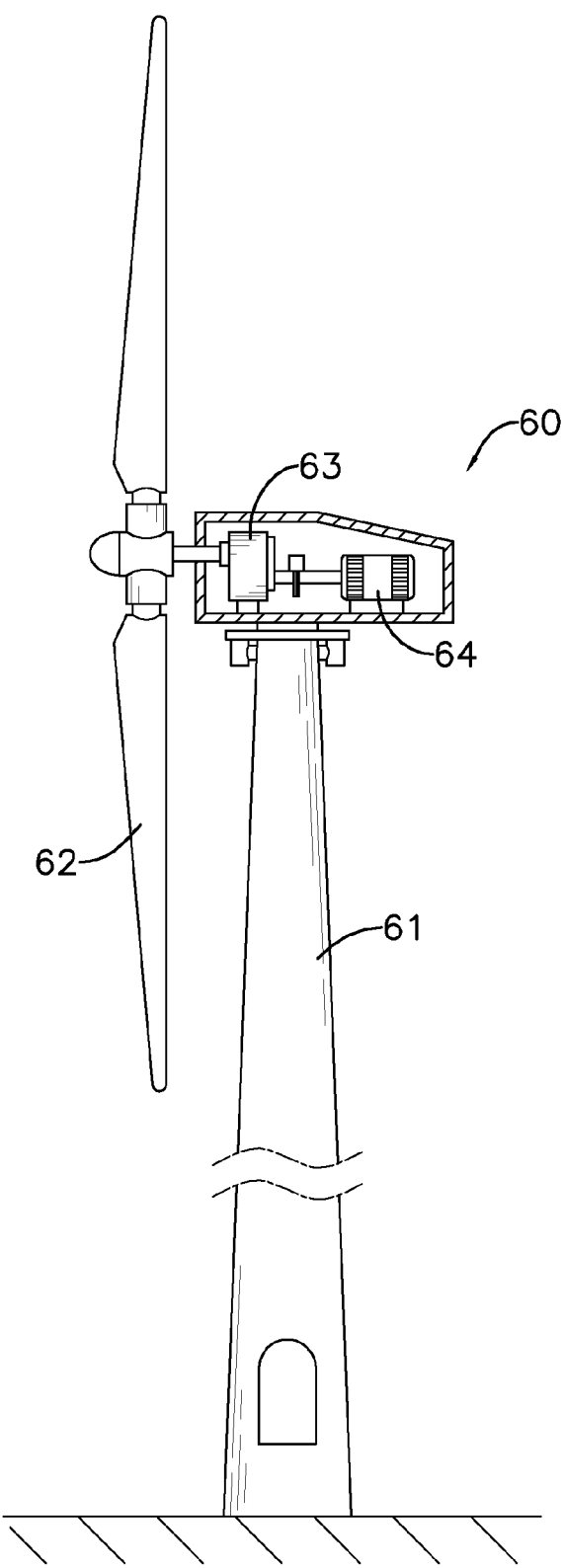
FIG. 2 is a side view in partial section of a wind turbine in accordance with the prior art.

With reference to FIG. 1, a wind turbine with hydro-transmission in accordance with the present invention comprises a tank (10), a generator (20), a stand (30), a water pump (40), a fan shaft (41), a drawing tube (42), a driving tube (43) and multiple blades (50).

The tank (10) may be mounted in a ground and is filled with circulating liquid (11). The circulating liquid (11) may be water or the like that has lower viscosity.

The generator (20) may be disposed on the ground, is disposed beside the tank (10) and has a drive shaft (21) and a rotor (22). The drive shaft (21) protrudes rotatably from the generator (20) and has a distal end protruding into the tank (10) and disposed over the circulating liquid (11). The rotor (22) is mounted on the distal end of the drive shaft (21) and may be a waterwheel, a noria, an impeller or the like.

The stand (30) is mounted up from the tank (10).

The water pump (40) is mounted at a top of the stand (30). The fan shaft (41) is connected to the water pump (40) and has an inner end and an outer end. The inner end of the fan shaft (41) is connected to the water pump (40). The outer end of the fan shaft (41) protrudes out of the stand (30).

The drawing tube (42) is connected to an inlet of the water pump (40), is mounted in the stand (30) and has a lower end protruding into the tank (10). The driving tube (43) is connected to an outlet of the water pump (40), is mounted in the stand (30) and has a lower end corresponding to the rotor (22) of the generator (20).

The blades (50) are mounted on the outer end of the fan shaft (41).

Thus, when wind rotates the blades (50) to drive the water pump (40), the water pump (40) draws the circulating liquid (11) up from the tank (10) and through the drawing tube (42) to increase potential energy of the circulating liquid (11). Then the circulating liquid (11) falls through the driving tube (43), changing potential energy to kinetic energy to drive the rotor (22) of the generator (20) and produce electricity by the generator (20).

The wind turbine with hydro-transmission as described as the following advantages. The generator (20) that is heavy and requires regular maintenance is easily accessible, while the water pump (40) that is light and requires relatively less maintenance is mounted at the top of the stand (30). Moreover, since only the water pump (40) is mounted at the top of the stand (30), the stand (30) is lighter and simpler. Thus, construction and maintenance costs and footprint of the wind turbine are reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wind turbine with hydro-transmission comprising
   a tank filled with circulating liquid;
   a generator disposed beside the tank and having
     a drive shaft protruding rotatably from the generator and having a distal end protruding into the tank and disposed over the circulating liquid; and
     a rotor mounted on the distal end of the drive shaft;
   a stand;
   a water pump mounted at a top of the stand;
   a fan shaft connected to the water pump and having
     an inner end connected to the water pump; and
     an outer end protruding out of the stand;
   a drawing tube connected to an inlet of the water pump, mounted in the stand and having a lower end protruding into the tank; and
   a driving tube connected to an outlet of the water pump, mounted in the stand and having a lower end corresponding to the rotor of the generator; and
   multiple blades mounted on the outer end of the fan shaft.

2. The wind turbine with hydro-transmission as claimed in claim 1, wherein the rotor of the generator is selected from the group consisting of a waterwheel, a noria and an impeller.

* * * * *